No. 758,290. PATENTED APR. 26, 1904.
J. A. ANDERSON.
FEEDER AND BAND CUTTER.
APPLICATION FILED JUNE 16, 1903.
NO MODEL. 3 SHEETS—SHEET 1.

Witnesses

Inventor
John A. Anderson
By J. A. Rosen
Atty

No. 758,290. PATENTED APR. 26, 1904.
J. A. ANDERSON.
FEEDER AND BAND CUTTER.
APPLICATION FILED JUNE 16, 1903.
NO MODEL. 3 SHEETS—SHEET 2.

Witnesses
C. J. Rosen
J. T. Fisher

Inventor
John A. Anderson
By J. A. Rosen
Atty

No. 758,290. PATENTED APR. 26, 1904.
J. A. ANDERSON.
FEEDER AND BAND CUTTER.
APPLICATION FILED JUNE 16, 1903.
NO MODEL. 3 SHEETS—SHEET 3.

Witnesses
Inventor
John A. Anderson

No. 758,290. Patented April 26, 1904.

UNITED STATES PATENT OFFICE.

JOHN A. ANDERSON, OF OSAGE CITY, KANSAS.

FEEDER AND BAND-CUTTER.

SPECIFICATION forming part of Letters Patent No. 758,290, dated April 26, 1904.

Application filed June 16, 1903. Serial No. 161,711. (No model.)

*To all whom it may concern:*

Be it known that I, JOHN A. ANDERSON, a citizen of the United States of America, residing at Osage City, in the county of Osage and State of Kansas, have invented new and useful Improvements in Feeders and Band-Cutters, of which the following is a specification.

The invention relates to self-governing feeders (including the band-cutters) for threshing-machines. While intended for all kinds of grain, the machine herein described is especially adaptable for wet or damaged grain.

The general object is to improve such devices.

The more special objects are to provide a governing mechanism whereby the feeder may be governed by the strain on the main driving-belt of the separator—that is to say, by the load instead of by the speed—so that when any part of the separator becomes clogged or overloaded the feeder will slow up or stop until the clogging or overload has been reduced. Further objects are to provide feed-blades and connections which more regularly feed as well as retard the straw or other material threshed; to provide governing apparatus for controlling the carrier. Other special objects will be explained more in detail hereinafter.

The invention consists of the novel combination, arrangement, and disposition of the parts, the preferred form of the embodiment whereof is shown and described in this specification and also shown in the accompanying drawings, forming part of this specification.

Figure 1:
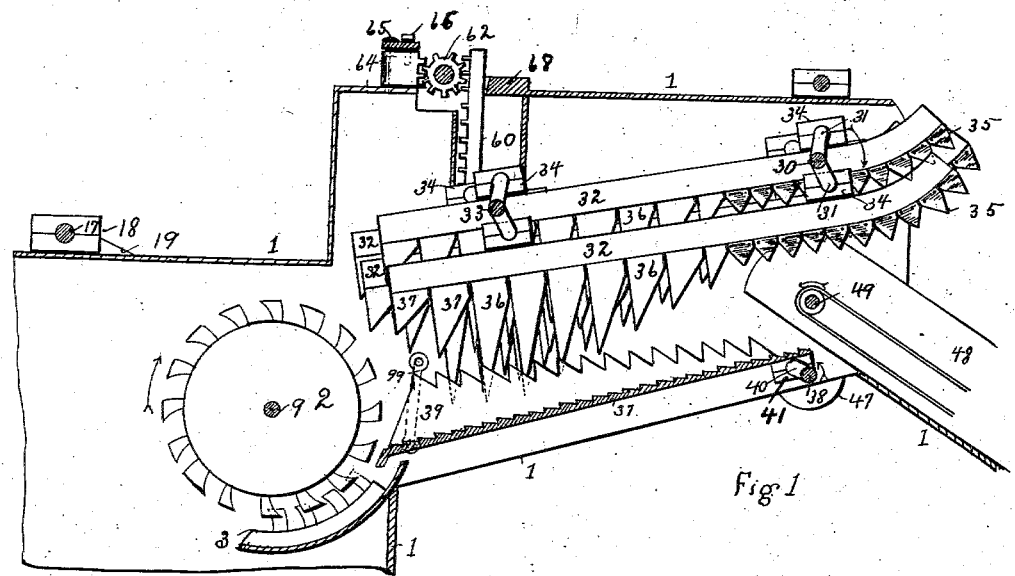
Figure 2:
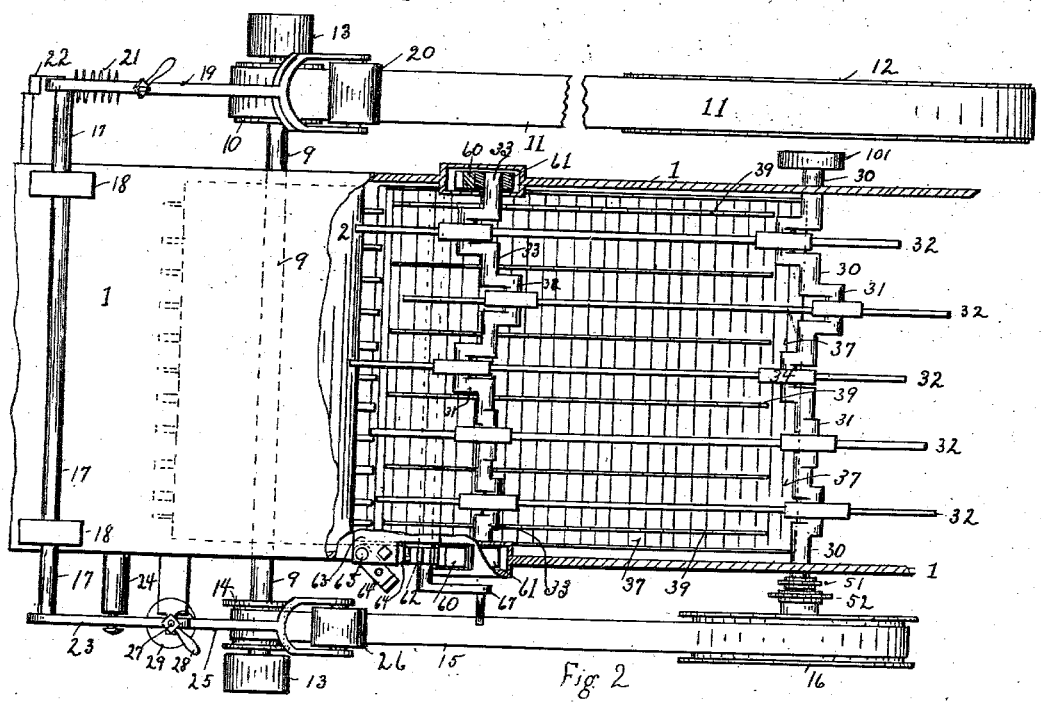
Figure 3:
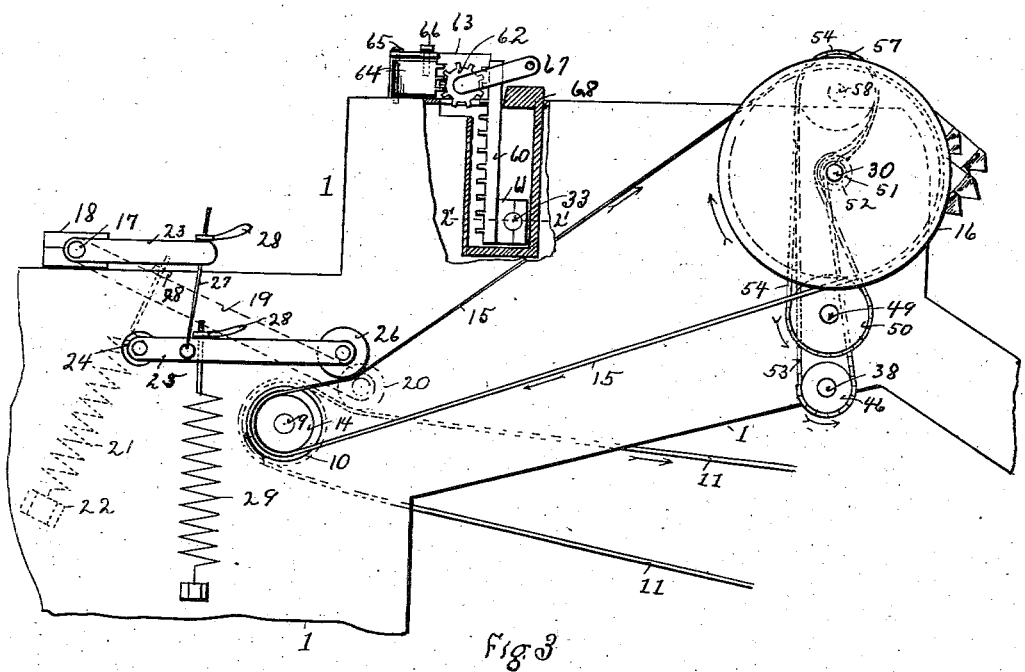
Figure 4:
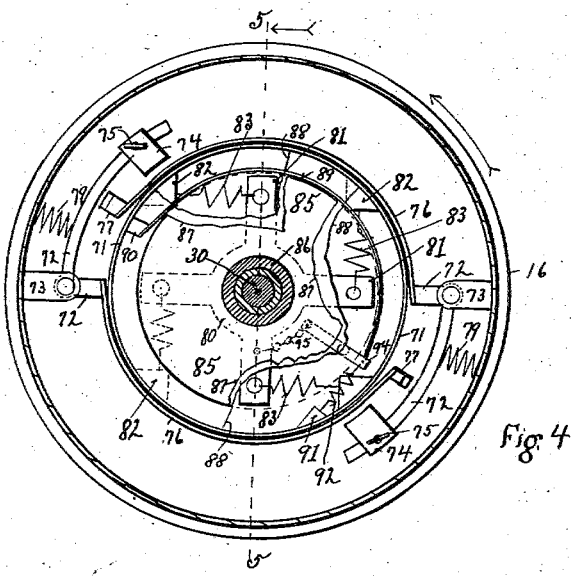
Figure 5:
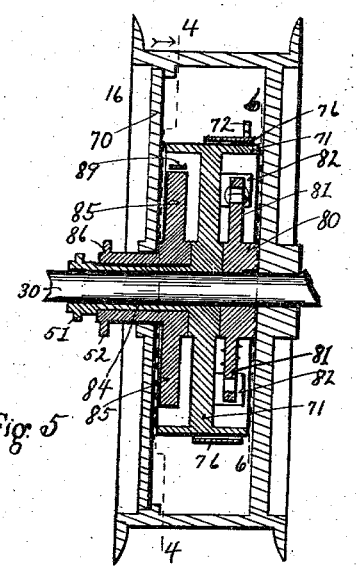
Figure 6:
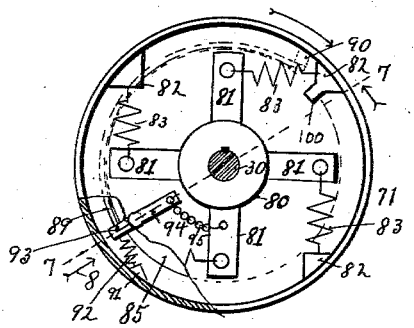
Figures 7, 8:
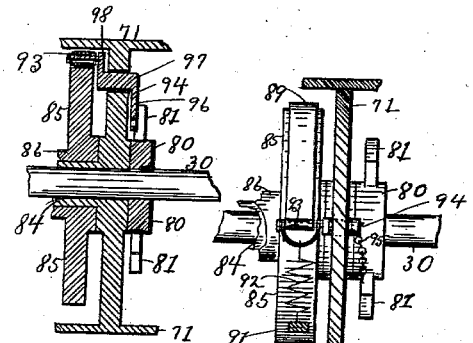
Figures 9, 10:
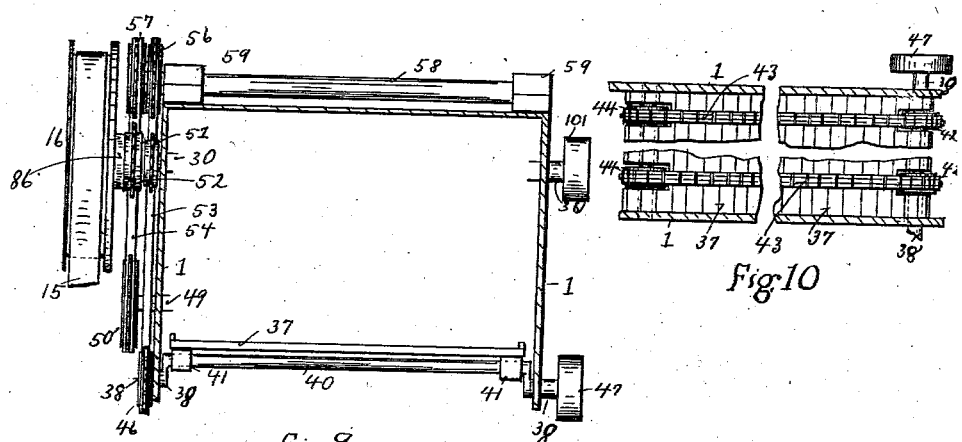
Figure 11:
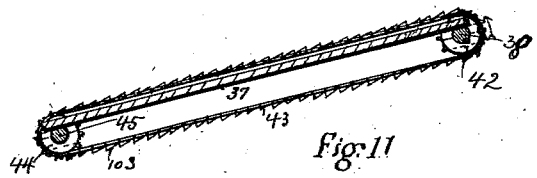

Figure 1 is a side elevation showing the internal mechanism, the near side of the frame being removed, also the frame for the rack and pinion for lowering and raising the lower ends of the knife-bars being shown in section. Fig. 2 is a top or plan view of the apparatus, part of the top of the frame being removed and one of the raising and lowering devices being shown in section through the line 2' 2', Fig. 3. Fig. 3 is a side elevation, a part of the frame being broken away to show the raising and lowering apparatus aforesaid. Figs. 1 and 2 are intended especially to illustrate the positions of the carrier, the feed-blades, knife-bars and knives, hopper-bottom, and cylinder, while Figs. 2 and 3 are intended to illustrate more especially the governing mechanism which is applied to the main driving-belt to govern the feed apparatus, although, of course, other parts than those specified are also illustrated in these figures. Fig. 4 is a view of the secondary governing apparatus through the line 4 4, Fig. 5. Fig. 5 is a central section of the same through the line 5 5, Fig. 4. Fig. 6 is a view of the tertiary governing apparatus through the line 6 6, Fig. 5. Fig. 7 is a center section of the same through the line 7 7, Fig. 6, only a broken portion of the rim of the pulley being shown. Fig. 8 is a side view of the same, taken as indicated by the arrow 8 in Fig. 6, the rim of the pulley being removed, except that fragments of the rim are shown. Fig. 9 is an end view of the frame, intended especially to show the relative positions of the sprockets and pulleys whereby the hopper-bottom and carrier are operated. Fig. 10 is a plan view of an alternative form of hopper-bottom; and Fig. 11 is a sectional view of the same, the near side of the frame being removed.

Like reference-numerals indicate like or corresponding parts throughout the several views.

1 is the frame, of any suitable form or size.

2 is the cylinder, of any kind, or it may represent any other form of separating mechanism.

3 represents the concave.

9 is the cylinder-shaft, on which is mounted the pulley 10, operated by the main drive-belt 11, driven by the engine-driver 12. The shaft 9, in addition to the pulleys 13 13, which operate other parts of the separator, not necessary to be here shown, also carries the flanged pulley 14, operating the belt 15, and pulley 16, which operates the feed apparatus. To a shaft 17, suitably mounted in the boxing 18 18 on top of the frame, is keyed the rod 19, carrying a pulley 20, which is adapted to bear normally quite low against the pulling part of the main drive-belt 11 and which is held against the same by the spring 21, attached to the lug 22 on the frame. At the other end of the shaft 17 is keyed the rod 23. Pivoted to the stud 24, projecting from the frame, is the arm or lever 25, carrying the pulley 26, which bears against the slack side of the belt 15, connecting pulleys 14 and 16. The levers 23 and 25 are connected by the rod 27 and nut 28, whereby the connection may be adjusted, and the pulley 26 is held firmly against the drive-belt 15 by the spring 29. It is noticed that the pulleys 20 and 26, with their connections, act as belt-tighteners for the belts 11 and 15. Normally the spring 29 is strong enough to hold pulley 26 firmly enough against belt 15 so that the belt will not slip; but as the separator, or any part thereof driven by the main drive-belt, becomes choked and the strain on said belt becomes greater, thereby straightening said belt against the pulley 20 and raising it, the pulley 26 will also be raised by the action of lever 19, shaft 17, lever 23, rod 27, and lever 25, thereby permitting the belt 15 to become more slack, so as to permit it to slip somewhat on its pulleys, thereby slackening the feed. When the strain on the main drive-belt becomes very great, the pulley 26 may be thrown entirely out of contact with the belt 15, thereby loosening it to such an extent as to permit the belt to slip without operating the pulleys, thereby stopping the feed mechanism until the strain or overload is reduced. It is understood, of course, that, if desired, the pulleys 20 and 26 and levers 19 and 25 instead of having springs may be suitably weighted so as to be drawn tightly against the belts 11 and 15. In either case, however, it will be seen that the belts when equipped with the yielding tighteners form a spring or yielding connection between their respective pulleys.

The pulley 16, through the apparatus hereinafter to be described, operates the shaft 30, which is provided with a series of cranks 31 31, radiating therefrom in different directions, on which are mounted the upper ends of the knife-bars 32 32, whose lower ends are mounted on a shaft 33, provided with cranks corresponding and similar to those on the shaft 30. The shaft 33 is operated by the knife-bars 32 32, and as these are mounted on the cranks radiating from the shafts 30 and 33 in different directions, as shown, there can be no "dead-center" of the shaft 33. The knife-bars 32 32 incline downwardly toward the cylinder. Their upper ends, which are curved upwardly, as shown, are provided with the knives adjacent to the exit end of the carrier to cut the bands thoroughly, and their lower ends are provided with feed-blades 36 36, which gradually increase in length toward the cylinder, except that the last ones are shorter in order to conform somewhat to the circumference of the cylinder, so as to effect a thorough and complete feed of the straw to the cylinder. By this arrangement of the feed-blades the straw is properly spread. 37 is the hopper-bottom. As shown in Figs. 1, 2, and 9, the hopper-bottom is loosely mounted, through boxing 41 41, on the eccentric 40 of the shaft 38, the other end being suspended by suitable hangers 99, one on each side. In Figs. 10 and 11 the hopper-bottom is stationary and is provided with a number of sprocket-chains 43 43, which have the teeth 103, extending from one end thereof to the other and from sprocket-wheels 42 42, mounted on the shaft 38, which in this case is straight and by which said chains are operated, to the sprocket-wheels 44 44, which are loosely mounted on the shaft 45. The sprockets may be provided with suitable tighteners. (Not here shown.) In the first case a number of fish-backs 39 39 may be used, one between each pair of knife-bars, as indicated in Fig. 2. In the drawings five knife-bars are shown, and these are so arranged, as explained, that while some of them are up others are down. The shaft 38 is driven by the sprocket-wheel 46 or by pulley 47, and the carrier 48, through its shaft 49, is driven by the sprocket-wheel 50. These two sprockets 46 and 50 are driven by the sprocket-wheels 51 and 52, (hereinafter to be described,) respectively, and the sprocket-chains 53 and 54, respectively, which pass over the idle sprocket-wheels 56 and 57, respectively, which may be loosely mounted on the shaft 58, suitably attached to the upper part of the frame, the object of the extra idle pulleys being to change the direction of rotation of the sprockets 46 and 50. By observing the relative sizes of the various sprocket connections just described it will be noted that the travel of the hopper-bottom will be slower than the travel of the knife-bars, thus serving to spread the bundles forward. This arrangement of the various parts combines the advantages of both the rotary and reciprocating motion in feeding apparatus.

The shaft 33, which carries the lower ends of the knife-bars, has its ends mounted in boxings 61 61, attached to the rack 60, engaging the pinion 62 on a suitable shaft in boxing 63, on the other side of which pinion is the block or key 64, pivoted to the frame by a pin 65 and having teeth to engage the teeth of the pinion 62 and being so located as to be capable of being turned into or out of engagement with the pinion, as indicated, to hold the pinion, rack, boxing, shaft, and lower ends of the knife-bars in any position to which they may be adjusted. The block 64 is held in place by a pin 66. The back of the rack slides against the frame 68, and the frame in which the rack and boxing are inclosed is also loose enough to allow for the slight horizontal motion in moving the parts vertically. The pinion-shaft may be provided with a crank and pin 67.

The pulley 16 may be provided with a double web or set of spokes, one being removable, so as to place therein the contained parts hereinafter described. This pulley contains two governors—first, a speed-governor to start the feed apparatus when the separating apparatus has attained "threshing speed" and to stop it when the separating apparatus falls below that speed, and, second, a governing device to regulate the carrier according to the load on the feeding driving mechanism.

In relation to the speed-governor this is much similar to other devices in use. The levers 72, pivoted to lugs 73 on the outer pulley 16, are provided with weights slidably secured thereon by thumb-screws 75. To the other arm of the lever 72 is attached the belt 76, which partially surrounds the inner pulley 71 and whose other end is attached to the lug 77 on the pulley 16, which lug 77 also serves to limit the inward movement of the weight-arm of the levers 72 against the pressure of the spring 79. Normally the spring 79 forces the weight-arm of the lever inwardly, so as to slacken the belt 76; but as the pulley is revolved the centrifugal force throws the weight-arms outwardly, so as to draw the belt or band 76 tightly against the periphery of the inner pulley 71, so as to frictionally engage the same, causing it to revolve with the outer pulley. The parts are to be so constructed and adjusted that upon the outer pulley arriving at threshing speed the weights will be thrown outwardly sufficiently to cause the bands 76 to engage the inner pulley and to release the same when the outer pulley runs slower. The pulley 71 is operatively connected to the shaft 30 by the lugs 82 82, springs 83 83, arms 81 81, and hub 80, keyed to the shaft 30. The springs 83 83 form the spring connection between the pulley 71 and the shaft 30. These operative connections with others form the governing device which will be described in the next paragraph. The governor just described is a speed-governor and governs the speed of the feeding apparatus according to the speed of the separator-cylinder, while the governor about to be described is a "strain-governor" and governs the speed of the carrier according to the strain on the spring connection between the driving-pulley 71 and shaft 30.

In describing the second governor contained in the pulley 16 I wish to eliminate the outer pulley 16 and the governing mechanism described in the last preceding paragraph and to refer to the pulley 71 as the "outer" pulley. None of the parts of the speed-governing mechanism except the pulley 71 are shown in Figs. 6, 7, or 8. Within the member 71, which is mounted loosely on the shaft 30, is a hub 80, from which radiates a number of arms 81 81, which are connected to lugs 82 82 on the inside of the outer pulley 71 by the springs 83 83. The hub 80 is keyed or otherwise suitably attached to the shaft 30. A sleeve 84 extends from the hub of the pulley 71 and has mounted thereon a sprocket 51, which may be bolted or keyed or otherwise suitably secured thereto. On the other side of the web or spokes of the pulley 71 (the side opposite that on which the hub 80 is located) is a disk or pulley 85, which is also provided with a sleeve, both disk 85 and sleeve 86 being loosely mounted on the sleeve 84, and the sleeve 85 has keyed or bolted or otherwise secured thereto a sprocket-wheel 52. Both sprockets have been described as operating, respectively, the hopper-bottom and the carrier.

In Fig. 4 the web of the outer pulley 71 is partially cut away, as indicated by the line 88, and the disk or pulley 85 is also partially cut away, as indicated by the line 87, in order to exhibit the relative positions of the various parts. A belt or band 89 is connected at one end to the lug 90 on the outer pulley 71 and at the other end to the lug 91 on the pulley 71 through the stirrup 93 and spring 92. Normally this belt is adapted to frictionally engage the periphery of the disk or pulley 85; but upon the tension of the spring 92 being released the band slackens and releases its grip upon the disk, thereby permitting the pulley 71 to revolve without the disk. The manner of causing the releasing of the tension of the spring 92 is as follows: The lever 94, mounted in and extending through the web or spokes of the pulley 71, has its inwardly-extending arm connected to one of the arms 81 by a chain 95, its other arm being attached to the stirrup 93. More specifically speaking, the lever 94 consists of the inwardly-extending arm 96, the axle 97, which forms the fulcrum therefor, and the outwardly-extending arm 98, as indicated in Fig. 7. The chain 95 normally hangs a little slack; but as the increased tension on the springs 83 83 is caused by the increased load on the shaft 30 such slack is taken up and the lever-arm drawn in the direction thereof, and the outer arm 96 is moved against the tension of the spring 92, thereby loosening the belt or band 89, which releases its normal grip on the disk 85, and, vice versa, as the load is reduced the belt or band 89 is again drawn tightly against the disk 85 by the normal tendency of the spring 92.

In case of breakage or when in case of very good grain it is not desired to use the governor last described the springs 83 83 and chain 95 may be removed and the arms 81 81 permitted to engage the lugs 82, which may be provided with extensions, as indicated by 100 in Fig. 6, thereby locking the pulley 71 and its contents together just as if it were a single piece.

The operation of the feeding mechanism is as follows: The direction of rotation of the shaft 30 is indicated by the arrow in Fig. 1, from which it will be seen that when the feed or knife blades are in the lower half of the circle of rotation they move toward the cylinder, while in the upper half their motion is in the opposite direction. In the motion toward the cylinder they engage, with the hopper-bottom, the straw and force it along down the hopper to the cylinder. From the peculiar construction of the feed-blades and hopper-bottom it will be seen that these parts act not only to feed, but also, in connection with the governing mechanism herein first described, to retard when their action is slowed down by the governor heretofore described. The retarding is accomplished by reason of the feed-blades adjacent to the cylinder being so long as to nearly engage the hopper-bottom, so that no straw can pass between the blades and the hopper-bottom except by being pushed along therethrough by the operation of the feed-blades and hopper-bottom. The feeding mechanism as a whole is governed by the governor herein first described, so that as the separator becomes more or less choked or overloaded the strain on the drive-belt becomes greater, thereby permitting the belt 15 to slip somewhat, thus slowing up the feeding mechanism, so that no more straw will be fed to the cylinder than the separator is capable of working. If the separator becomes too much overloaded, then, as heretofore explained, the entire feeding mechanism will stop until the overload is reduced. It is understood, of course, that the strength of the springs, their tensions, &c., are all subject to being adjusted by the various nuts and other devices used for such purposes.

The operation of the last-described governing mechanism is as follows: As the pulley 71 revolves it carries with it the inner hub 80 and shaft 30 by means of the springs 83 83, which connect the pulley 71 to the arms 81 81 of the hub 80. The pulley 71 also causes to revolve with it the hopper-bottom shaft 38 through the sleeve 84, sprocket-wheels 51 and 46, and sprocket-chain 54, so that the feed-blades and hopper-bottom may operate harmoniously. Normally the band 89 is drawn tightly around the periphery of the disk 85 by the spring 92, so that normally the said disk revolves with the pulley 71 and carries with it the carrier-shaft 49 through the sleeve 86, sprocket-wheels 52 and 50, and sprocket-chain 54. As the load between the feed-blades and hopper-bottom becomes greater, thereby causing them to increase the tension on the springs 83 83, causing them to expand, the slack in the chain 95 will be taken up and the lever 94 moved against the tension of the spring 92, thereby loosening the belt 89 and releasing the disk 85, so that the carrier will stop until the overload in the feeder is reduced enough to relax the tension on the springs 83 83 sufficiently to slacken the chain 95, when the belt 89 will again be drawn tight by the spring 92. The purpose of this peculiar arrangement is to govern the carrier solely by the load between the feed-blades and hopper-bottom and so that wet straw, which is quite heavy, may be placed on the carrier without stopping it, as it will be noted that the strain on the carrier-shaft is not borne by the springs 83 83, by which said carrier is governed, but by the pulley 71. Another purpose is that when used in the form shown in the drawings the load on the hopper-bottom shaft 38 does not affect the tension of the springs 83 83, and consequently does not affect the governing device which controls the carrier-shaft; but if it is desired that the load on the hopper-bottom shall also be included in the governing apparatus, then the chain 54 may be removed and the pulleys 47 and 100 (see Fig. 9) connected by a suitable belt, so that the strain on the hopper-bottom shaft 38, as well as that on the crank-shaft 30, will affect the tension of the springs 83 83, whereby the carrier-shaft is governed. The object in having this changeable arrangement is to adapt the feeding mechanism to the various kinds of grain.

Comparatively speaking, the variations caused by the load in the feeding devices will not be sufficient to operate the first-described governor, and the second and third described governors will serve to keep the feeding apparatus uniform, so that the first governor will be controlled entirely by the load of the separator. In this manner the feeding mechanism as a whole will be governed by the load of the separator, while the rack or carrier will be governed by the load in the feeding apparatus without reference to the weight on the carrier.

It is now seen that by the arrangement herein described the feeding of the straw into the cylinder may be nicely governed not only according to speed, but also according to the load. Thus if the separator becomes overloaded the first-described governor will cause the feeding apparatus and carrier to slow up or to stop. If the engine drives the cylinder below threshing speed, the second-described governor will cause the feeding apparatus and carrier to stop. If the feeding apparatus becomes overloaded, then the carrier will be caused to slow up or to stop by reason of the operation of the third-described governor. It should also be noted that an overload on the carrier does not affect the springs 83 83, so that even though the carrier be loaded with wet and heavy straw the third-described governor will not be affected thereby, but the carrier will be governed entirely by the load in the feeding apparatus.

In the drawings I have shown the pulleys as having solid webs. It will be understood, of course, that they may have spokes. While I have shown the pulley 16 as having a double web, it may be provided with a single web or a single set of spokes with a rather large hub. I have shown the above forms of my invention as illustrating the principles thereof and do not intend to limit myself unduly to the peculiarities of form or construction, but contemplate all suitable changes of form or construction, proportions, and the substitution of equivalent members as may be desirable and necessary.

The first and third described governing mechanism herein is the subject-matter of an application, Serial No. 151,995, filed by me April 10, 1903, for a patent for "Governing or controlling mechanism," to which reference is hereby made.

What I claim as new, and desire to secure by Letters Patent, is—

1. The combination with a frame; of the carrier; the hopper-bottom; the separator; the two shafts arranged in the frame having a series of corresponding cranks radiating therefrom in different directions; a knife-bar mounted on each pair of cranks provided with knives at their upper ends adjacent to the exit end of the carrier, and with feed-blades at their lower ends adjacent to the separator, said blades being of gradually-increasing length toward the separator; and suitable operative connections and driving mechanism therefor.

2. The combination with a frame; of the separator; the feeding apparatus; the pulley and belt and connections for driving the separator; the pulley and belt and connections for driving the feeding apparatus; the belt-tightener for each belt; and suitable operative connections whereby the second belt-tightener is governed by the pressure of the first-named belt against its tightener.

3. The combination with a frame; of the separator; the feeding apparatus; the pulley and belt and connections for driving the separator; means for driving the feeding apparatus; the belt-tightener for the belt, and suitable operative connections whereby the means for driving the feeding apparatus is governed by the pressure of the belt against its tightener.

4. The combination with a frame; of the separator, shaft, main driving-pulley therefor, and a belt and suitable driving mechanism therefor; the feeding apparatus, the shaft and driving-pulley therefor, and the drive-belt for said pulley and suitable means for operating the same; the arm carrying a pulley bearing against the drive-belt of the separator-pulley; the arm carrying a pulley bearing against the drive-belt of the feeding-apparatus pulley; and suitable operative connections whereby the pressure of the first-named belt against its pulley governs the pressure of the second-named pulley against its belt.

5. The combination with a frame; of the separator and driving mechanism therefor; the feeding apparatus and driving mechanism therefor; the carrier and driving mechanism therefor; the governing mechanism for controlling the feeding apparatus and carrier according to the resistance of the separator to its driving mechanism; the governor for governing the feeding apparatus and carrier according to the speed of the cylinder; and the governor for controlling the carrier according to the resistance of the feeding apparatus to its driving mechanism.

6. The combination with a frame; of the feeding apparatus and the driving-shaft therefor; the pulley loosely mounted on the shaft and suitable driving means therefor; the spring connection between the pulley and the shaft; the disk adjacent to the pulley; the carrier, and operative connections between the disk and the carrier whereby the carrier is operated by the disk; the belt on the pulley normally engaging the disk so as to cause it to revolve therewith; and suitable operative connections whereby as the tension on the spring connection is increased or diminished the belt is loosened or tightened on the disk.

7. The combination with a frame; of the feeding apparatus; the driving-shaft therefor; the pulley loosely mounted on the shaft, and suitable driving mechanism therefor; the spring connection between the pulley and the shaft; the disk adjacent to the pulley; the carrier operatively connected with the disk and adapted to be operated thereby; the belt secured to the pulley and adapted normally to engage the disk; the lever fulcrumed on the pulley, and connected at one end with the belt and at the other end with the shaft; whereby as the tension on the spring connection is increased or diminished the belt is loosened or tightened on the disk.

Witness my hand in the presence of witnesses.

JOHN A. ANDERSON.

Witnesses:
 I. L. BETZER,
 C. G. BLAKELY.